APPARATUS FOR EXPOSING SPECIMENS TO MAXIMUM AMOUNTS OF SUNLIGHT

This invention relates to an apparatus for exposing specimens to sunlight and weather. The specimen-carrying means is driven by driving means which is provided with circuits for reproducing the solar orbit and controlling the drive means to drive the specimen-carrying means so that the specimens are exposed to direct sunbeams all the time. The drive means is driven to follow both the sun's azimuth and altitude, so that fading and weathering tests may be carried out rapidly.

In conventional testing methods for fading and weathering, samples are tested by placing then on a frame inclined at an angle of 45° and fixed so as to face to the south.

Because of the frame base is fixed with respect to the position of the sun which is moving over the course of time, such samples are exposed to the sunlight in an inefficient manner, and much time must be spent for exposure before test results can be obtained.

For effective exposure to sunlight during exposure tests, a device which is always directed toward the sun or which can follow the sun, is needed. However there are difficult problems to solve in devising means to follow the sun for any length of time. For example, such mechanical means as are already employed with astronomical telescopes are usually only for following the rotation of the earth, and their ability to follow the sun is limited. Such means will not be very useful for perfect following of the sun because of the necessity for manual adjustment at each time of observation or at least once a day.

In a weathering test a device is required which can be operated continuously without any adjustment for at least 1 year. Therefore, such means as described above are not suitable.

Another means which has been used is an electrical means which drives the specimen carrying means to follow the sun by balancing a number of photogalvanic cells or photoelectric tubes greater than two and on which the sun's image or beams are received. However, the operation of such means depends on good weather conditions, and becomes less sensitive with deterioration of such light receptors. For these reasons this means is not satisfactory.

The disadvantages of the prior art devices are eliminated by the apparatus of the present invention, in which a device for carrying out exposure tests is provided which is able to follow the sun for a 1 year time period on the basis of calculation of the solar orbit.

The invention will be described in greater detail in connection with the accompanying drawings, in which:

FIG. 1 is a diagram showing circuits for calculation of the sun's path and control of the apparatus;

FIG. 2 is a perspective view of a practical mechanism including the circuits of FIG. 1;

FIG. 3 is a perspective view of the exterior of a unit incorporating the mechanism of FIG. 2;

FIG. 4 is a perspective view of an exposure test device;

FIG. 5 is a diagrammatic view showing movement in the azimuth direction as viewed from above the speciment-carrying frame;

FIG. 6 is a similar view showing movement in the altitude angle viewed from the side of the speciment-carrying frame;

FIG. 7 is a graph showing the relation between seasonal time and the sun's altitude; and FIG. 8 is a graph showing the relation between seasonal time and the azimuth angle.

The altitude and azimuth of the sun at any time is given by formulas; $\sin h = \sin\phi\sin\delta\cos\phi\cos\delta\cos t$ (1) $\sin h \sin\phi - \sin\delta = \cos h \cos\phi\cos\alpha$ (2)

where
$\phi$: latitude at the point of exposure
$\delta$: declination at the time of exposure (for example; $-23°$ in Jan. Tokyo and $+22°$ in June)
$t$: Hour angle (0° at the southing, 15° for 1 hour)
$h\alpha$: altitude of the sun from a level surface
$\alpha$: azimuth FIGS. 7 and 8 are graphs showing values obtained by calculation based on formulas (1) and (2) of the altitude and azimuth at Tokyo at the vernal equinox, the summer solstice, and the winter solstice.

Control of driving means to cause the apparatus to follow the sun is by a device formed of electric circuits as shown in FIG. 1 and a mechanism using two cams 9 ans 17 as shown in FIG. 2 in combination therewith. Voltage output to satisfy the above formulas (1 and (2) is balanced to control the altitude and azimuth angle by means of servomotors.

A circuit including voltage detector $G_1$ is provided at the upper part of section 1 in FIG. 1 for calculating the altitude of the sun according to formula (1.) A circuit including voltage detector $G_2$ is provided at the upper part of the sectwon 2 for moving the device to the altitude thus calculated. A circuit including voltage detector $G_3$ at the lower part of section 1 for calculating the azimuth angle according to Formula (2), and a circuit including voltage detector $G_4$ is provided at the lower part of section 2 for moving the device to the azimuth thus calculated.

$R_1$ to $R_{12}$ are variable resistances all having stationary elements and movable elements. Eight of the resistances, $R_1$ to $R_4$ and $R_7$ to $R_{10}$ are wire wound resistances, which respectively vary as a trigonometric function, the sine or the cosine of the rotary angle of 360°, as indicated in the drawing $R_5$, $R_6$, $R_{11}$, and $R_{12}$ are resistances linear with respect to the rotary angle of 360°.

Resistance $R_1$ is equivalent to $\cos t$, $R_2$ to $\delta$, $R_3$ to $\sin\delta R_4$ to $\sin h$, $R_7$ to $\sin h$, and $R_8$ to $\sin\delta$, $R_9$ to $\cos\alpha$, $R_{10\ to\ cos}h$, $R_5$ and $R_6$ to the altitude $h$, and $R_{11}$ and $R_{12}$ to the azimuth angle $\alpha$.

The movable elements of resistances $R_2$, $R_3$ and $R_8$ are fixed on one shaft to be rotated together thereon as indicated by dotted lines, and the movable elements of resistances $R_4$, $R_5$, $R_7$ and $R_{10}$ are mounted on another shaft, also as indicated by dotted lines, and the movable elements of resistances $R_9$ and $R_{11}$ are mounted on a third shaft.

Separate DC voltage sources $E_1$ to $E_{10}$ such as batteries or output from a voltage regulator are connected across the various resistors.

Sources $E_1$, $E_4$, $E_6$, $E_7$, $E_9$, and $E_{10}$ have the same potential E, and the voltage of source $E_2$ is multiplied by $\tan\phi$ so that, for example, if $\phi=35°39'$, then $\tan\phi=0.71725$, and voltage $E_2 = 0.71732E$. Source $E_3$ is voltage E divided by $\cos\phi$ and sources $E_5$ and $E_8$ are voltage E multiplied by $\sin\phi$ and $\cos\phi$ respectively.

Voltage detectors $G_1$ to $G_4$ include servoamplifiers and are coupled to servomotors 20, 39, 18 and 33 respectively.

D is a time axle which is driven by clock or synchronous motor so as to make one station per day and is coupled to the rotary shaft of resistance $R_1$.

A cam mechanism S is coupled to the stationary element of resistance $R_1$ for moving it slightly for correcting for seasonal changes at the time of culmination (the time when the sun is due south). The range of angles though which cam mechanism S is rotated is about $\pm 15°$.

A cam mechanism Y is provided for converting an annual change in the declination of the sun into an angular quantity by turning the rotary shaft connected to resistances $R_2$, $R_3$ and $R_8$.

The section 1 enclosed by a chain line in FIG. 1 is structurally embodied as shown in FIG. 2 and is housed in the unit of FIG. 3. In FIG. 1 section 2 servomotors 39 and 33 correspond to servomotors 39 and 33 in FIG. 4. Similarly $R_6$ and $R_{12}$ correspond to resistances 31 and 40 in FIG. 4.

Now the principal of operation will be explained. In the circuit for calculation of altitude of FIG. 1 the voltage $E_1$ is divided by resistances $R_1$ and $R_2$ with the output voltage of resistance $R_2$ being $E_1 \cos t \cos\delta$. The voltage $E_2$ is divided in resistance $R_3$ with the output voltage being $E_2 \tan\phi\sin\delta$. The voltage $E_3$ is divided in resistance $R_4$ with the output voltage being $$E_3 \frac{1}{\cos\phi} \sin h$$

INVENTOR.
Richard G. Macadam
BY
Harness, Dickey & Pierce
ATTORNEYS

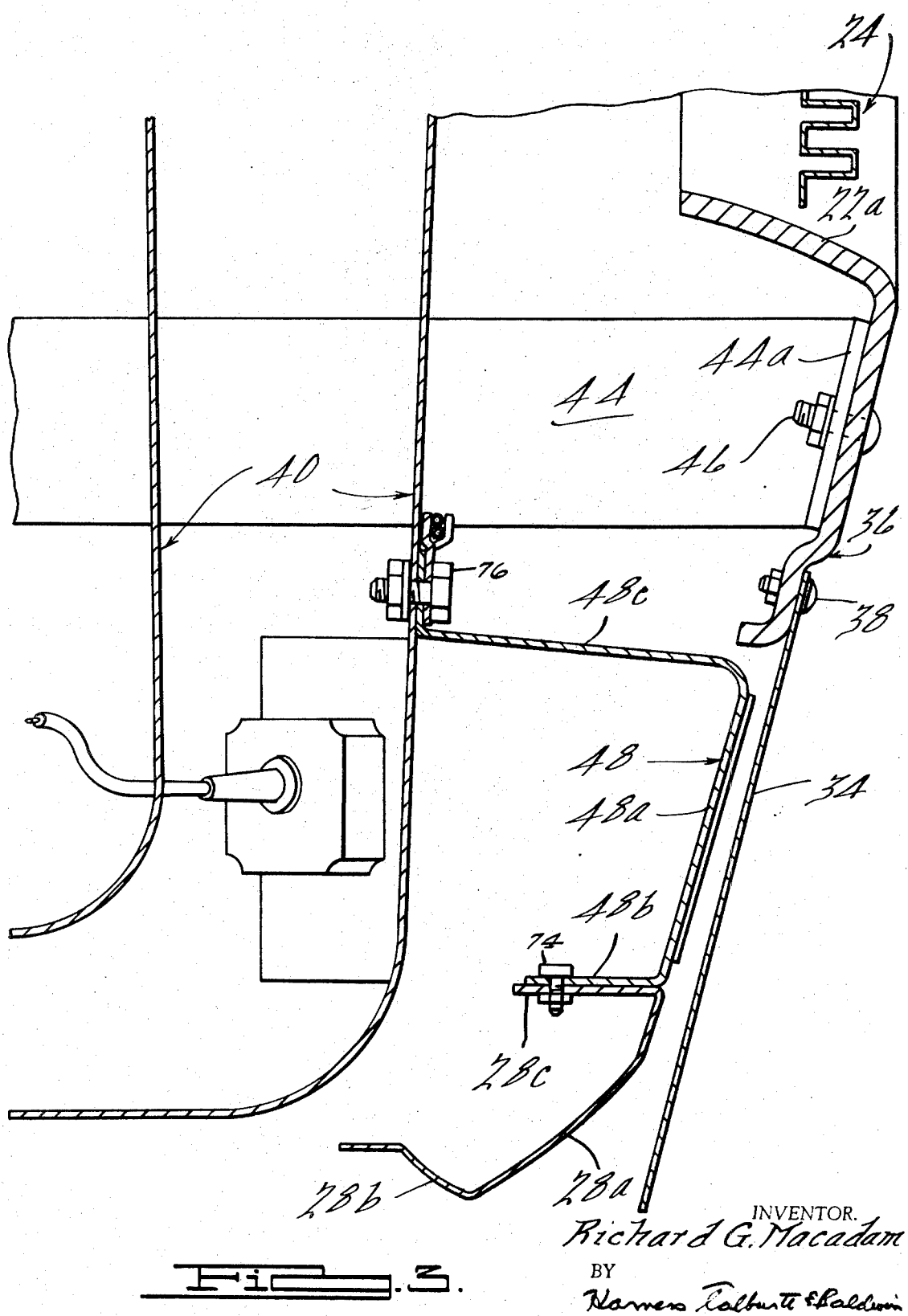

3,633,020

AUTOMOTIVE CORNERING LAMP

BACKGROUND OF INVENTION

Cornering lights for automobiles comprise lamps located at opposite sides of the front end of the vehicle which are turned on under night time conditions in response to actuation of the turn signals to illuminate the area into which the vehicle is being turned. Cornering lights typically have been located in the front fender panels forwardly of the wheel openings. In this position, they are cosmetically exposed and must be dressed up with chrome trim and the like to provide a pleasing appearance. Since decorative trim is a relatively expensive item, the cornering lights have been relatively expensive and their use has thereby been discouraged. The typical front fender cornering light location has also presented space problems, and wire routing problems.

SUMMARY OF THE INVENTION

According to the invention, the front license plate of the vehicle is mounted in a position where it depends downwardly from the central portion of the front bumper and a cornering light assembly is located in a generally concealed position in the area immediately beneath the bumper and directly behind the license plate; the light assembly includes a pair of cornering lamps which are positioned to direct light laterally outwardly from opposite sides of the license plate to provide cornering illumination for the vehicle. Since the cornering light assembly is substantially hidden from view, it need not have a decorative or finished appearance and may accordingly be relatively inexpensively produced. The behind-the-license plate location also provides an abundance of space for the cornering light assembly, and simplifies the wire routing to the lamps.

Other objects, features and advantages of the invention will be apparent from the detailed description of the preferred embodiment.

BRIEF DESCRIPTION OF THE DRAWINGS

A preferred embodiment of the invention is illustrated in the drawings in which:

FIG. 3 is a cross-sectional view taken on line 2—2 of FIG. 1.

DETAILED DESCRIPTION OF THE PREFERRED EMBODIMENT

Figure 1:
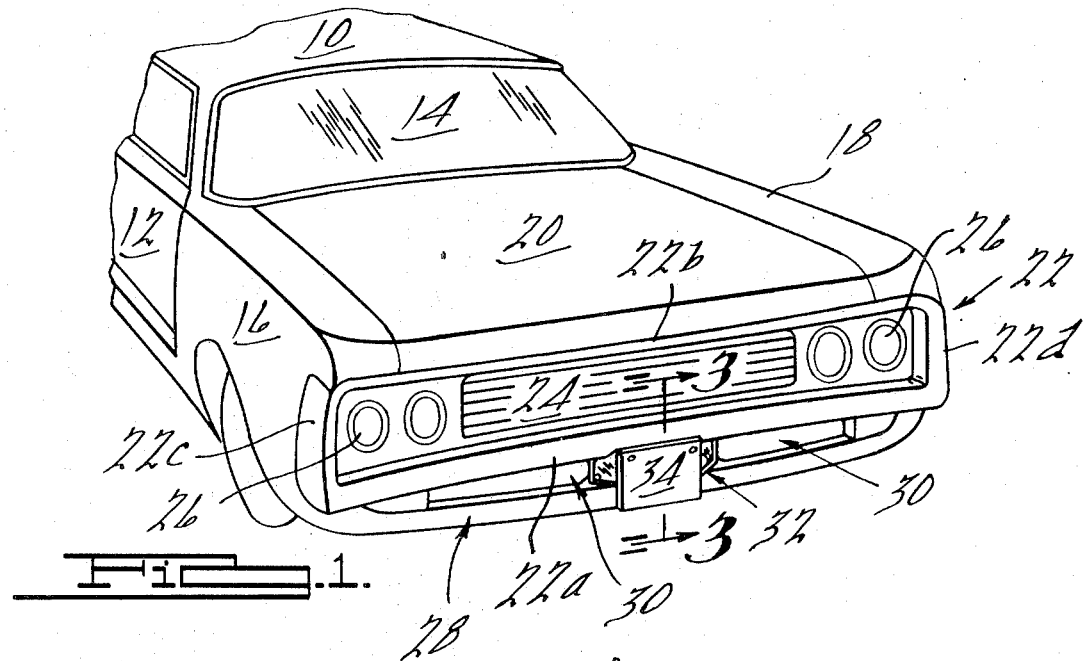
FIG. 1 is a fragmentary, perspective view of a motor vehicle embodying the cornering light assembly of the invention.

The automobile seen fragmentarily in FIG. 1 includes a roof 10, door 12, windshield 14, front fenders 16, 18, hood 20, front bumper 22, grille 24, and headlamps 26. Bumper 22 is of the "loop" type completely encircling grille 24 and includes a lower horizontal portion 22a extending horizontally across the front end of the vehicle below grille 24, an upper horizontal portion 22b extending across the vehicle front end above grille 24, and vertical end portions 22c, 22d interconnecting upper and lower portions 22a, 22b. A sheet metal radiator air panel 28 is welded at its opposite ends to the lower forward edge of fenders 16, 18 and extends across the vehicle front end below bumper portion 22a; panel 28 is spaced downwardly from bumper portion 22a to define an air space 30 for the entry of cooling air for the vehicle radiator. A cornering light assembly, seen generally at 22, is positioned centrally in space 30 directly behind front license plate 34.

Figure 2:
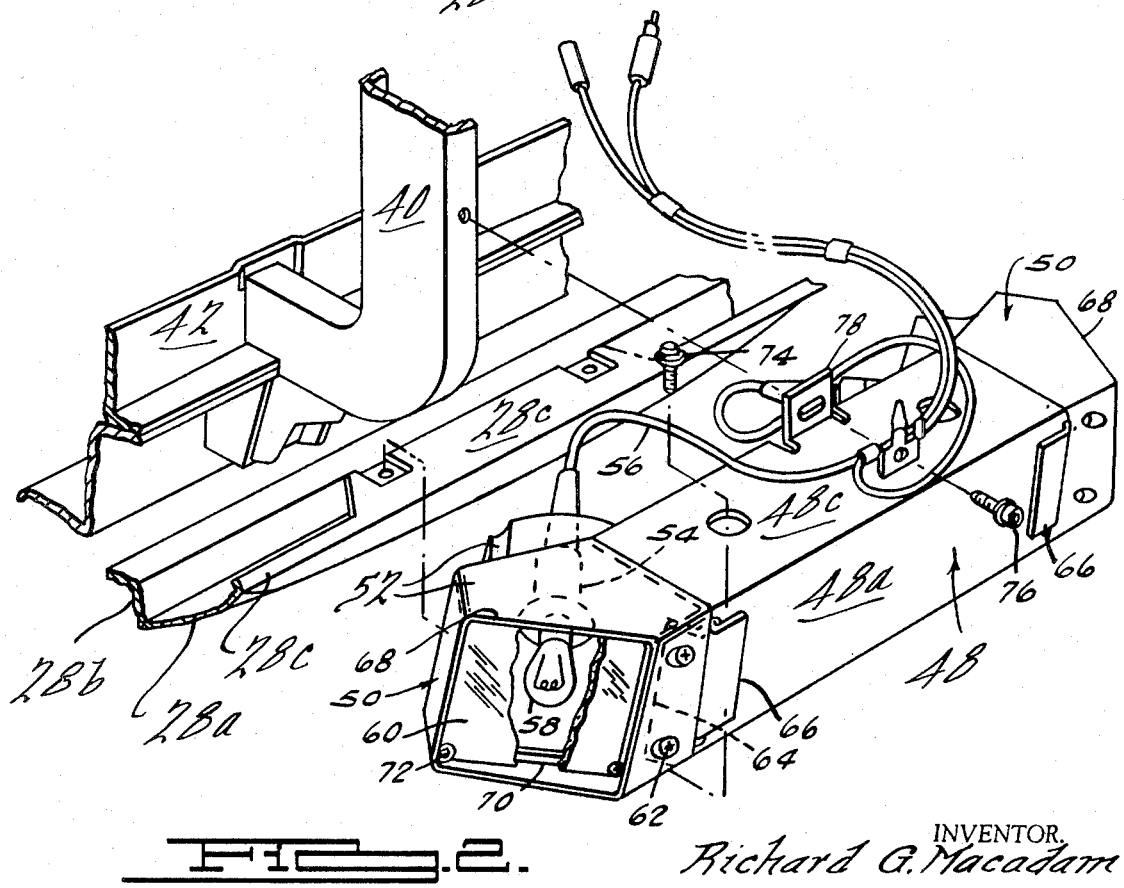
FIG. 2 is an exploded perspective view showing the relationship of the invention cornering light assembly to the adjacent vehicle front end structure.

Reference is now made to FIGS. 2 and 3. The upper edge of license plate 34 is received in an indentation 36 formed centrally of bumper portion 22a along its lower edge. Plate 34 is fixed in depending relation to bumper portion 22a by screw bolts 38 passing through suitable apertures in the bumper.

Air panel 28 is generally channel shaped in cross section and includes an arcuately configured front portion 28a, a rearwardly extending lower leg portion 28b, and a rearwardly extending upper leg portion 28c.

The vehicle front end structure also includes the usual central vertical pillar 40 to support the hood latching mechanism. The lower end of pillar 40 is suitably secured to front end body structure 42 of conventional form. Pillar 40 is channel-shaped and the section of FIG. 3 is taken through the pillar looking toward the open side of the pillar so that the pillar appears in that FIG. as two parallel spaced webs. Bumper 22 is anchored to the vehicle body structure by bumper brackets 44 (only one of which is seen) of known form which extend forwardly from the vehicle body structure and terminate in a flange 44a which butts against the rear face of bumper lower portion 22a and receives the usual bumper bolt 46.

Cornering light assembly 32 includes a central elongate bracket 48 of U configuration and a pair of lamp assemblies 50 secured to the opposite ends of bracket 48. Bracket 48 includes a front portion 48a, a rearwardly extending lower leg portion 48b, and a rearwardly extending upper leg portion 48c.

Each lamp assembly 50 includes a lamp housing 52, a socket 54 assembled to a cable 56, a bulb 58, and a lens 60. Each housing 52 is secured to bracket 48 by screws 62 engaging a tab 64 formed as a bent over portion of bracket front panel portion 48a with a locating tab 66 on the housing coacting with the forward face of bracket portion 48a to laterally align the lamp assembly with the bracket.

Each socket 54 is mounted in an angled disposition in housing 52 with the socket centerline extending obliquely with respect to the lengthwise axis of bracket 48. Each housing forward outboard corner is chamfered at 68 to provide an angled seat 70 for lens 60 to position lens 60 generally normal to the socket centerline. Lens 60 is held on seat 70 by screws 72.

Cornering light assembly 32 is secured centrally in air space 30 by screw bolts 74 passing downwardly through bracket lower leg 48b and air panel upper leg 28c, and by a screw bolt 76 passing rearwardly through an upstanding tab 78 on bracket upper leg 48c and through an aperture in the forward web of lock pillar 40.

With the cornering light assembly in assembled position in air space 30, the beams of cornering lamps 50 are directed laterally outwardly and forwardly with respect to the vehicle to illuminate the areas immediately forwardly and immediately laterally of the vehicle to assist in night time turning maneuvers of the vehicle. The cornering light assembly is substantially hidden behind the front license plate and yet provides adequate illumination to either side of the vehicle.

While a preferred embodiment of the invention has been illustrated and described in detail, it is to be understood that various changes may be made in the disclosed embodiment without departing from the scope or spirit of the invention as defined by the appended claims.

I claim:

1. In a motor vehicle having a front end structure comprising a grille, a bumper, a hood, a generally vertical pillar for supporting a hood-latching mechanism and a license plate mounted on said front end structure centrally of said vehicle, an improved lighting assembly operative to provide cornering illumination for the vehicle, said lighting assembly comprising an elongate bracket having a planar surface with opposite end portions, said bracket being secured to said front end structure such that said license plate overlies said bracket, a lamp housing secured to each one of said bracket end portions and having a lens seat which is at an angle with respect to said planar bracket surface, said lamp housings being laterally spaced from each other a distance generally the same as the width of said license plate such that said license plate is in an adjacent and nonoverlying position with respect to said lens seats.

2. An improved lighting assembly according to claim 1 wherein said bracket is secured to said pillar.

3. An improved lighting assembly according to claim 1 wherein said motor vehicle front end structure further includes a radiator air front panel extending horizontally across said vehicle front end beneath said bumper and vertically spaced from said bumper at least adjacent the central space between the bumper and air panel, said lighting assembly being positioned within said central space.

* * * * *